UNITED STATES PATENT OFFICE.

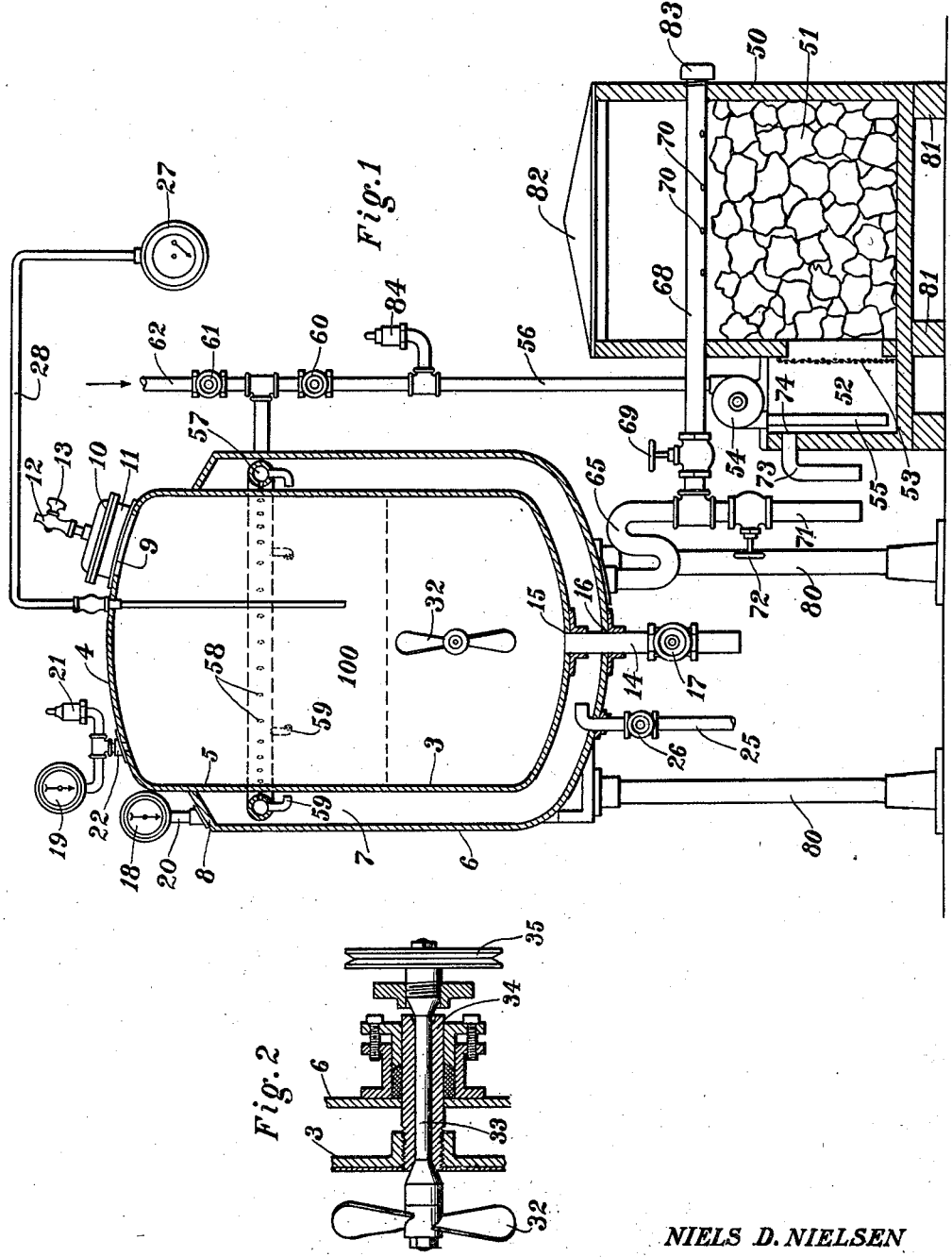

NIELS D. NIELSEN, OF ELYRIA, OHIO.

PROCESS OF TREATING MILK AND THE LIKE.

1,274,750.            Specification of Letters Patent.    Patented Aug. 6, 1918.

Original application filed February 9, 1918, Serial No. 216,622. Divided and this application filed March 22, 1918. Serial No. 223,909.

*To all whom it may concern:*

Be it known that I, NIELS D. NIELSEN, a citizen of the United States, residing at Elyria, in the county of Lorain and State of Ohio, have invented certain new and useful Improvements in Processes of Treating Milk and the like; and I do hereby declare the following to be a full, clear, and exact description of the invention, such as will enable others skilled in the art to which it appertains to make and use the same.

This application is a division of my application No. 216,622, filed Feb. 9, 1918.

This invention relates to processes for treating and handling milk or the like, and has for its principal object the provision of an improved process for eliminating any possibility of infection of the milk, its certain and proper preservation and for a simplification of such processes.

One of the objects of the invention is to provide a simple, economical and efficient process for treating milk or the like, and of providing means for cooling the milk in the container in which it has been sterilized, and of preserving it at a low temperature in such condition until it is to be drawn for use, for example, into bottles, small containers or the like.

Other and further objects of the invention will appear from an examination of the following description of an embodiment of my invention and of the appended claims, and from an inspection of the accompanying drawings which are made a part of this specification.

Figure 1 shows one embodiment of my invention, illustrating the container and the cooling apparatus in section, and the ducts, pipes, etc., in elevation.

Fig. 2 is a section showing one form of agitating means suitable for employment with my invention.

Referring now to the drawing, at 3 are shown the walls and at 100 the interior of a receptacle, here shown as a closed tank for heating, cooling, holding and otherwise treating milk or like liquid in accordance with my invention. In the embodiment shown, the tank is closed by a top 4 and preferably provided with a lining 5 of glass or enamel. The major portion of the tank is surrounded by a jacket 6, providing a jacket space 7 between the tank proper 3 and the jacket 6. At 8 is shown an apron, which closes the top of the space 7, making the same gas-proof. The apron 8 may be connected to the tank in any suitable manner, such as by welding. The top 4 is provided with a manhole 9 having a cover 10 therefor adapted to suitably close the manhole in the top of the tank. This cover may be removably connected to a sleeve 11 on the top of the tank. A vent tube 12 may be mounted upon the manhole cover 10 and controlled by a valve 13.

A discharge pipe 14 leads from an opening 15 through the space 7 and an opening 16 in the jacket 6 to any suitable destination. A valve 17 is provided for controlling this discharge pipe 14. Vacuum and pressure gages are shown at 18 and 19 mounted in position to communicate with the interior of the tank and with the space 7, respectively. A passage 20 connects the gage 18 to the space 7 and a passage 22 connects the interior of the tank to the pressure gage 19 and to a safety valve 21. The gages and safety valve, of course, may be of any well known construction.

A steam supply pipe is shown at 25, leading from a suitable source of steam (not shown) to the space 7 and is controlled by a valve 26. A recording theremometer 27 is employed to indicate and record the temperature of the interior of the tank to which it is connected by a tube 28.

The tank is provided with agitating means, here shown as a propeller 32 mounted upon a shaft 33, which passes through a sleeve 34 mounted in the walls 3 and 6. Means through which the propeller is driven is provided and here consists of a pulley 35. The details of this construction are not described here, since they constitute no part of this invention.

When rotated, the propeller coöperating with the walls of the tank, distributes the contents thereof about in such a manner as to cause the heating or cooling effect of the medium in the space 7 to act uniformly or substantially uniformly upon the contents of the tank, and thereby more quickly and evenly bring it to the desired temperature.

Apparatus is provided for producing and introducing a cooling medium to the space 7, here shown as an ice chest for cooling brine, and means for introducing it to said space and withdrawing it therefrom. At 50 is shown the ice chest proper filled with ice 51. A brine chamber is shown at 52, separated from the ice chest proper by a screen 53. A brine pump is shown at 54, which, when operated, causes the brine to flow through the intake 55 and the discharge pipe 56 to a delivery pipe 57, whence it is delivered to the walls of the tank and the space 7. The delivery pipe 57 is best formed to completely surround the tank and is provided with a plurality of perforations 58 and jets 59 from which the cooling fluid is sprayed upon the various portions of the wall of the tank in such a manner as to run down the walls in a sheet. A valve 60 controls the pipe 56. A second valve 61 controls a pipe 62 leading from any source of water at ordinary temperature, such as a city main, to the delivery pipe 57.

It will be apparent that the valve 60 may be closed and the valve 61 opened, when water of ordinary temperature is to be supplied to the tank.

The brine is returned through a pipe 65 to a feed pipe 68, which is controlled by a valve 69. The brine flowing through 65, 69 and 68 is returned to the ice chest through openings 70 in the feed pipe 68. A discharge pipe is shown at 71 controlled by a valve 72. When it is desired to discharge the brine rather than return it to the ice chest, the valve 69 may be closed and 72 opened. At 73 is shown an overflow pipe for the brine chamber 52, and which leads from an overflow opening 74 therein to waste. Suitable means are provided for supporting the tank and associate structure, such as columns 80. The ice chest is supported by blocks 81 and is covered with a suitable cover 82. The pipe 68 is dead-ended by a cap 83. A safety valve 84 is employed in connection with the pipe 56.

The valves, both ordinary and safety, may be of any suitable form, many of which are upon the market. I may also use any suitable form of pump at 54 for conveying the brine to the jacket chamber 7, or it will be apparent that any other suitable means may be employed for causing the brine to flow into such chamber.

In practising my improved method or process of treating milk or the like, a supply of milk to be operated upon is placed in the treating chamber 100 inclosed by the walls 5, and the same is pasteurized, by introducing the heating medium, such, for example, as steam, which may be introduced to the space 7 through the pipe 25. During the exposure of the contents of the chamber 100 to such heating medium, the agitator 32 is operated to quickly and uniformly expose all particles of the contents of such chamber to such heating medium.

The contents of the chamber having thus been pasteurized, the valve 26 is closed, leaving the space 7 filled with steam, which is condensed by introducing cool water, cold brine or other steam condensing medium. In the embodiment shown this is introduced through the feed pipe 57 from the source connected with pipe 62, or through the pipe 56 from the cooling apparatus. The condensation of the steam in space 7 leaves a vacuum or partial vacuum therein, which acts as a heat insulating medium and preserves the contents of the chamber 100 at a constant or substantially constant temperature for as long a period of time as is desirable in this work; for example, the contents of the tank may be brought to a temperature of 142° F. or 145° F. and maintained at such temperature for thirty minutes.

It is very important to cool the milk or the like, without removing it from the chamber in which it was pasteurized, to avoid exposing it to contamination during such moving. Accordingly, the means for introducing the cooling brine to the space 7 is operated in the manner already described and the contents of the chamber 100 brought to the desired temperature without removing it from the tank. During the cooling, the agitating means should be operated to uniformly and evenly distribute the contents of the tank to the cooling medium, so as to quickly bring it to a uniform temperature, preferably about 36° F. When such temperature is reached, the pump 54 is stopped and the valve 60 is closed so as to prevent further introduction of cooling brine to the space 7. The brine, however, is permitted to drain from the chamber 7 so as to empty the chamber thereof. It is important to maintain the contents of the tank at the temperature to which it has thus been brought, often for some hours. It is also important to accomplish this purpose without removing the contents of the tank from such tank, in order not to expose it to contamination. This step of my invention is accomplished in the following way:

The valves 69 and 72 are closed and valve 26 is opened, permitting enough steam to flow through the pipe 25 to fill the space 7 between the walls 3 and 6. The valve 26 is then closed. Enough of cooling water is then introduced through the distributing pipe 57 to condense the steam in 7, and thereby produce a vacuum or substantially a vacuum in such space, which, acting as a heat insulating medium, prevents the access of heat to the contents of the tank, whereby the temperature of such contents is maintained constant, or substantially constant for the desired period of time. The condensing fluid may be introduced to the space 7 either through the pipe 62 controlled by the valve 61, or the pipe 56 controlled by the valve 60.

It will be apparent that the supply of milk or the like in the tank may thus be preserved at substantially the temperature to which it has been reduced, for considerable periods of time, and that it may be withdrawn from the tank, for use, into bottles or the like, without any opportunity of its having been infected, and with certainty of its purity.

I have illustrated and described this embodiment of my invention for the purpose of better explaining the same. I do not wish to be limited to such embodiment, or the details thereof, as I contemplate many departures therefrom without departing from the spirit of my invention, which is set forth in the appended claims.

I claim:—

1. The method of treating milk or like liquid, which consists in sterilizing the same, then cooling said liquid to about 36° F. and then filling a space surrounding or substantially surrounding a vessel containing said liquid with a condensable gas and then condensing said gas and thereby creating a heat insulating vacuum about said liquid and then thus maintaining the temperature of such liquid at about 36° F. for a desired length of time.

2. The method of treating milk or like liquid, which consists in sterilizing the same by heat applied to the vessel containing the liquid through a heating medium confined in a space between the walls of such vessel and a jacket thereabout, then cooling said liquid to about 36° F. by applying to such vessel a cooling medium in said space, then withdrawing such cooling medium and filling said space with steam and then condensing the steam in such space by introducing cold water into such space.

3. The method of treating milk or like liquid, which consists in sterilizing the same by filling a space surrounding or substantially surrounding such liquid with a heating medium, then introducing to such space a cooling medium to cool said liquid, then when said liquid is cooled to a desired temperature, introducing to such space a condensable gas and condensing said gas, thereby surrounding or substantially surrounding said liquid with a heat insulating vacuum and thereby maintaining such liquid at a low temperature for a desired length of time.

4. The method of treating milk or like liquid, which consists in sterilizing the same by heat applied to the vessel containing the same through a heating medium confined in a space between the walls of such vessel and a jacket thereabout, then cooling such liquid to about 36° F. and creating a heat insulating vacuum about such liquid by filling such space with a condensable gas and condensing such gas and then maintaining such liquid at such temperature for a desired period of time.

5. The method of treating milk or like liquid, which consists in sterilizing the same by heat applied to the vessel containing the same through a heating medium confined in a space about said liquid, then cooling such liquid to a desired low temperature and maintaining such liquid at substantially such temperature by creating a heat insulating vacuum in such space.

6. The method of treating milk or the like, which consists in sterilizing the same by heat applied to the vessel containing the liquid through a heating medium confined in a space between the walls of said vessel and a jacket thereabout, withdrawing such heating medium and then cooling said liquid to about 36° F. by introducing into such space a cooling medium, then withdrawing such cooling medium and filling said space with steam and then introducing to said space jets of cool water injected near the top thereof and permitted to flow down the walls of said vessel and thereby condensing said steam and creating a heat insulating vacuum in such space.

7. The method of treating milk or like liquid, which consists in sterilizing the same, cooling said liquid to about 36° F. by applying a cooling medium in a space surrounding or substantially surrounding a vessel containing such liquid, withdrawing such cooling medium and filling said space with a condensable gas and then condensing said gas by introducing cool water to such space and thereby creating a heat insulating vacuum.

8. The method of treating milk or like liquid, which consists in sterilizing the same by heating the same to a temperature of about 142° to 145° F. by filling a space surrounding said liquid with steam, then condensing said steam by introducing to said space sufficient cooling medium to condense said steam and thereby creating a vacuum or partial vacuum in said space to insulate said liquid from exterior heat, then thereby maintaining such liquid at a constant temperature of 142° to 145° F. for about thirty minutes, cooling said liquid to about 36° F. by applying a cooling medium in such space, then withdrawing said cooling medium and again filling said space with steam and then condensing said steam by again introducing sufficient cooling medium to said space to condense said steam and thereby creating a heat insulating vacuum about said liquid, whereby it may be maintained at the temperature to which it has been reduced.

9. The method of treating milk or the like, which consists in sterilizing the same by heating the same to a temperature of about 145° F. by filling a space surrounding said liquid with a heated condensable gas, then introducing to said space sufficient cooling medium to condense said gas and thereby creating a vacuum or partial vacuum in said space to insulate such liquid from heat, then thereby maintaining such liquid at a constant temperature for about thirty minutes, then introducing to said space a cooling medium sufficient to reduce the temperature of the liquid to about 36° F., then withdrawing such cooling medium and again filling said space with a condensable gas then condensing said gas by introducing cooling water to such space and thereby creating a heat insulating vacuum about said space, whereby the temperature of the liquid may be maintained constant for a suitable period of time.

In witness whereof, I have hereunto signed my name this 11th day of March, 1918.

NIELS D. NIELSEN.